April 27, 1937. R. R. ROBERTSON 2,078,280
LOAD TRANSMISSION JOINT WITH RUBBER SEALING CAP
Filed Oct. 5, 1934 2 Sheets-Sheet 1
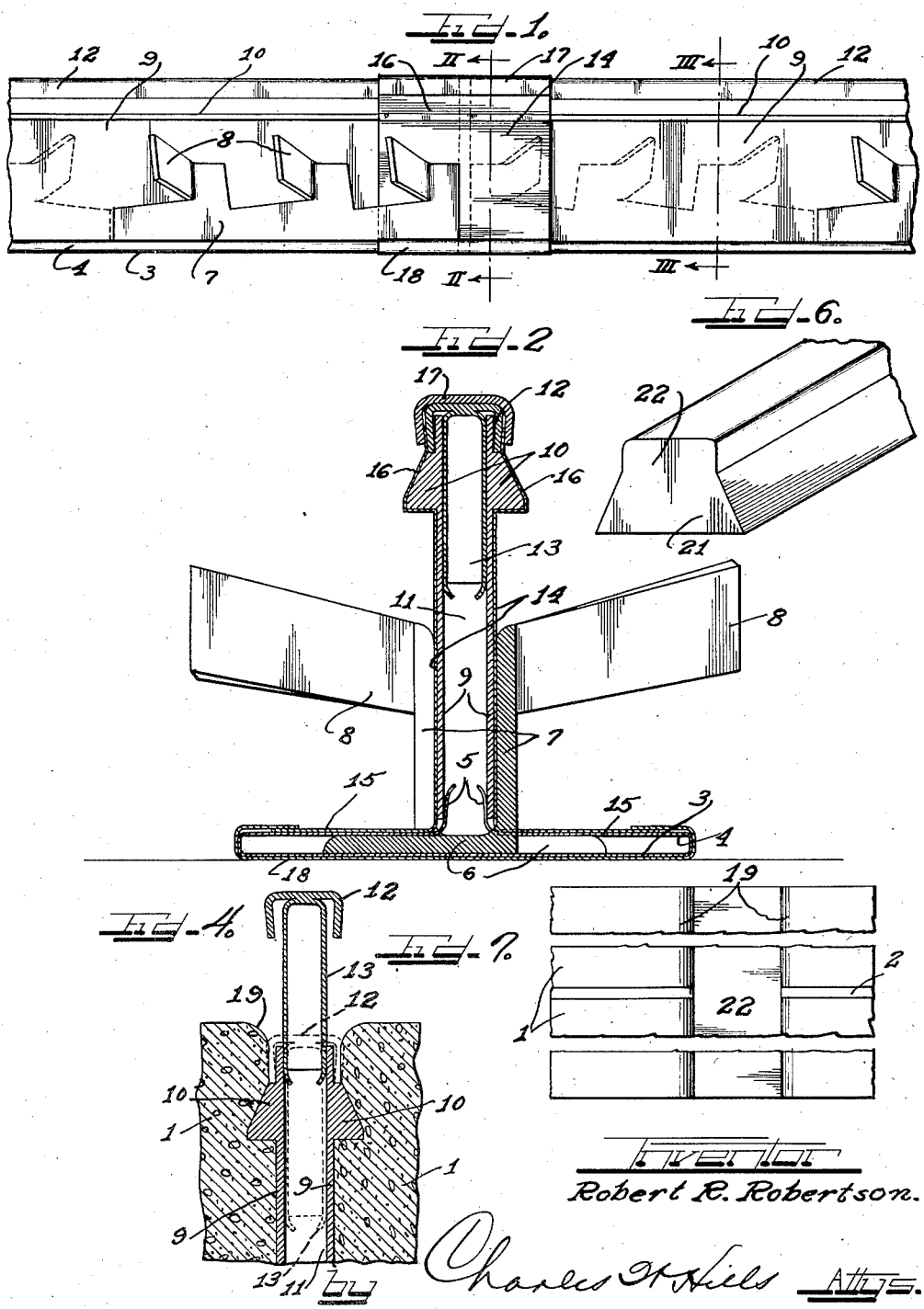
Inventor
Robert R. Robertson.

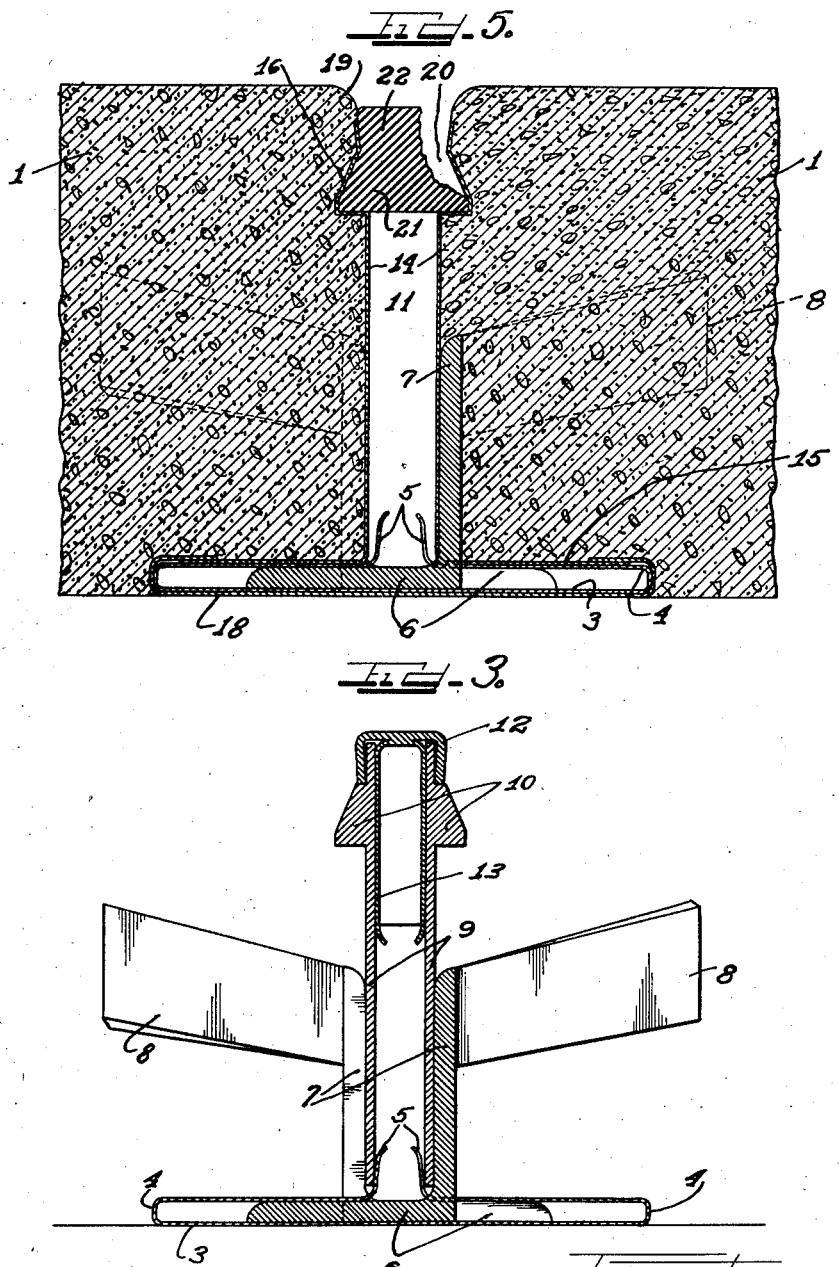

Patented Apr. 27, 1937

2,078,280

UNITED STATES PATENT OFFICE 2,078,280

LOAD TRANSMISSION JOINT WITH RUBBER SEALING CAP

Robert R. Robertson, Chicago, Ill., assignor to The Translode Joint Company, Chicago, Ill., a corporation of Illinois Application October 5, 1934, Serial No. 746,976

7 Claims. (Cl. 94—18)

The present invention relates to a concrete road expansion joint and more particularly to an improved load transmission joint forming mechanism, including an improved removable void forming core unit which is normally supported on a load transmission base, said core unit being so constructed that when it is removed from between adjacent concrete slabs or sections, an expansion void is formed with the upper portion of the void enlarged, and of a predetermined shape for the reception of a rubber sealing bar, which is pre-formed and of a substantially dovetail cross-section, to permit the same to be locked in position to serve as a closure cap for the expansion void, the bottom of which is closed by means of the load transmission base.

It is an object of this invention to provide a load transmission expansion joint comprising an expansion void, the bottom of which is closed by means of a load transmission base while the upper portion of the void is closed by means of a pre-formed rubber sealing cap which is so shaped that it is held locked in position against accidental removal due to suction action of vehicle tires rolling over the joint, or other causes.

It is also an object of this invention to provide an expansion joint, the expansion void of which has the border walls thereof provided with grooves of predetermined shape for the reception of a pre-formed elastic sealing bar or cap for closing the upper end of the expansion void.

It is a further object of this invention to provide an expansion joint forming mechanism, including a void forming mold, having side wall plates formed with projecting ribs or bars, said side walls having the upper portions thereof spaced from one another by means af an improved removable top form. The side walls and top form are removable after the pouring of the concrete to provide an expansion void having the side walls thereof provided with grooves into which a pre-formed elastic closure cap is forced into a locked position for closing the upper end of the expansion void.

It is an object of this invention to provide a load transmission joint forming mechanism including a load transmission base having removably supported thereon aligned void forming core units shaped to provide dovetailed pockets in the side walls of the expansion void resulting from the removal of the aligned core units, said joint forming mechanism being provided with removable splice members for overlapping the abutting ends of the core units to obviate the entrance of concrete into the core units, and furthermore serve as a means for closing the road center joint where it intersects the expansion joint.

A further object of the invention is to provide an improved method of forming a road expansion joint, said method consisting of supporting a load transmission base and a collapsible void forming core on a road sub-grade, and then pouring concrete over the base and on opposite sides of the collapsible core, then removing the collapsible core to provide an expansion void above the base, the said void being formed with a locking recess into which a pre-formed elastic bar is forced to seat and form an adjustable closure cap for the top of the joint.

It is an important object of this invention to provide a road expansion joint including an expansion void having the upper portion thereof shaped to permit a pre-formed resilient closure bar or cap to be forced into a locked position to close the upper portion of the joint and be adjustable with variations in the width of the joint due to the expansion and contraction of road slabs produced by temperature changes.

Other and further important objects of this invention will be apparent from the disclosures in the specification and the accompanying drawings.

The invention (in a preferred form) is illustrated in the drawings and hereinafter more fully described.

On the drawings:

Figure 1 is a side elevation of a load transmission joint mechanism embodying the principles of this invention, illustrating splicing or coupling means in position overlapping the adjacent ends of the core units.

Figure 2 is an enlarged vertical transverse section taken on line II—II of Figure 1.

Figure 3 is an enlarged transverse vertical section taken on line III—III of Figure 1.

Figure 4 is a fragmentary transverse detail section of the upper portion of an expansion joint with the core plates still in position and illustrating the top form in elevated position ready for removal and also illustrating, in dotted lines, the lowermost position of the removable top form.

Figure 5 illustrates a fragmentary vertical section through a concrete construction illustrating the completed load transmission joint, showing the improved rubber sealing cap in position for closing the upper end of the joint void and also illustrating the load transmission base which closes the bottom of the expansion void.

Figure 6 is a fragmentary perspective view of one end of the rubber sealing cap removed from the joint.

Figure 7 is a fragmentary top plan view of a portion of a concrete road showing the rubber sealing cap in position transversely of the road and intersecting the road center joint.

As shown on the drawings:

In Figure 7, a fragmentary portion of a concrete road is illustrated, showing the road divided into slabs or sections 1 by means of a longitudinal center joint 2 and a transversely positioned load transmission joint. The load transmission joint is formed by an improved method wherein a load transmission base unit is supported on a road sub-grade and in turn supports a void forming core mechanism which, after the pouring of concrete, is removed to form an expansion void the upper portion of which is closed by an improved pre-formed sealing unit.

The load transmission base unit which serves as a load transmitting mechanism between adjacent sections 1 of a concrete road or other construction, comprises an elongated base member consisting of a solid base plate 3 constructed of sheet metal or other suitable member. The longitudinal margins of the base plate 3 are bent upwardly and then inwardly toward one another to form oppositely positioned guide channels 4. The guide channels 4 of the base unit provide oppositely positioned guide grooves. The margins of the top plate of the guide channels 4 are bent upwardly and are cut away to provide spaced upwardly projecting retaining flanges or fingers 5. The retaining flanges 5 on opposite sides of the base unit are staggered with respect to one another. Notches are provided between the retaining flanges 5 on each side of the base unit to permit load transmitting anchor shoes or holders to be seated therein in proper spaced relation for the support of a core unit hereinafter more fully described. The load transmitting mechanism associated with the base unit consists of a plurality of anchor shoes or holder sections which are movably or shiftably engaged in the base section and are arranged longitudinally in offset or staggered relation with respect to one another. The anchor shoes or holders are of substantially identical construction and are arranged with the adjacent shoes reversed with respect to one another, as clearly illustrated in Figure 1. Each of the anchor shoes is constructed of metal and comprises an angle bar including a base flange 6 and an upright flange or web 7 integral with said base flange. Struck outwardly from the upper margin of each of the anchor shoe upright flanges or webs 7 are anchoring blades or wings 8 leaving the inner side of the upright flange or web flap.

Removably supported between the anchor shoes of the base section, is a void forming core unit comprising a pair of metal side walls or plates 9, the lower longitudinal margins of which are held properly spaced apart by being inserted in the spaces between the inner faces of the upright flanges or webs 7 of the anchor shoes and the outer faces of the retaining flanges or tongues 5, as clearly illustrated in Figure 3. Integrally formed or rigidly secured on the outer surface of each of the side wall plates 9 near the upper margin thereof is a longitudinally disposed bevelled or upwardly tapered bead or rib 10. The shape of the bead or rib 10 is such that when the side walls or plates 9 are removed from the concrete, an enlarged substantially dovetailed opening is provided between the adjacent slabs 1 and above the main part of the expansion joint void 11.

For the purpose of closing the upper portion of the removable core unit, a U-shaped closure cap 12 is used in an inverted position, and as clearly illustrated in Figure 3, fits downwardly over the upper margins of the side walls or plates 9 with the lower edges of the side flanges of the channel shaped cap 12 seated upon the top surfaces of the beads or ribs 10. Rigidly secured at spaced intervals within the core closure cap 12 are spacing boxes or members 13.

As illustrated in Figure 1, a pair of the road joint forming base units, each of a length of substantially the width of one-half of the road, are positioned upon the road sub-grade in alignment with one another to span the width of the road. The void forming units which are removably supported on the base units are also provided in lengths equal to the width of one-half of the road so that the two complete units have the inner ends thereof either abutting one another or spaced a slight distance apart, as indicated in dotted lines in the middle portion of Figure 1. For the purpose of closing the gap between the inner ends of the two joint forming mechanisms or for splicing said mechanisms where they intersect the center joint 2 of the road, a gap spanning device is provided and comprises a pair of oppositely positioned guard splice plates 14, the lower ends of which are deflected outwardly to form closure feet or base flanges 15 which project outwardly over the top flanges of the channel portions 4 of the base unit, to span the gap between the base units. A section of each of the guard splice plates 14 near the upper end thereof is deflected outwardly to provide a channel section 16 shaped to fit around the adjacent ends of the groove forming beads or ribs 10 of the side walls or plates 9 of the core unit. The upper margins of each of the splice plates 14 project upwardly to seat against the outer sides of the adjacent ends of the top closure caps or forms 12. To hold the two upper ends of the splice plates 14 against the outer sides of the adjacent ends of the top closure caps 12, and to close the gap between the adjacent ends of said caps 12, a channel or U shaped splice cap 17 is removably engaged over the adjacent ends of the core closure caps 12. For the purpose of closing the gap between the adjacent ends of the base sections 3, a channel shaped base plate 18 is seated beneath the adjacent ends of the base units 3 and projects upwardly and inwardly to seat over the ends of the base flanges 15 forming a part of the side plates 14.

With the completed road joint forming unit in position upon the road sub-grade to span the entire width of the road, and with the splice unit engaged around the adjacent ends of the aligned base sections and core units of the device, concrete is poured upon the sub-grade on opposite sides of the joint forming mechanism to imbed the various members thereof.

After the concrete has been allowed to set a desired amount, the splice cap 17 is removed, as well as the core unit caps 12, which are lifted from the dotted line positions of Figure 4 into the full line positions, until after the upper edges of the concrete slabs 1 of the joint are edged to form the rounded edges 19. After the edging operation has been performed, the side wall plates 9, following the complete removal of the caps 12, are moved inwardly towards one another and are lifted upwardly from between the concrete slabs 1, thereby forming the expansion joint void 11, the upper end of which is enlarged by the use of the beads or ribs 10, leaving a substantially dovetail shaped opening 20.

Attention is called to the fact that with the removal of the core unit caps and the side wall plates, to form the expansion void 11, the side splice plates 14 and the splice plate member 18 are left in position as clearly illustrated in Figure 5. Attention is also called to the fact that the lower end of the expansion void 11 is closed by means of the load transmission base unit. For the purpose of closing the upper end of the expansion void 11, an improved flexible closure unit is used in the form of a rubber sealing cap or bar comprising a dovetail shaped base section 21, the top of which integrally connects up or terminates in a substantially rectangular top section 22. The flexible closure cap 21—22, being constructed of rubber or other suitable material, is placed above the expansion joint void and is of a length substantially that of the entire width of the road. The resilient sealing cap is then forced downwardly into the enlarged upper chamber 20 of the expansion joint void until the base section 21 springs into a locking engagement with the enlarged portion of the void which was formed by the side wall beads or ribs 10. The upper portion of the sealing cap fills that portion of the void which was formed by the removal of the core unit caps 12. As clearly illustrated in Figure 5, the top of the sealing cap 22 is positioned slightly below the top level of the concrete slab 1.

The present invention embodies the provision of an improved load transmission joint forming mechanism for roads and the like, including load transmission base sections and removable core units which are positioned in alignment with one another and have the adjacent ends thereof inclosed by means of a splice unit constructed to also serve as a means for spanning the gap between adjacent ends of the load transmission base units. The core units have the removable plates or side walls thereof constructed with integral beads or ribs of selected shape for the purpose of forming a substantially dovetail shaped enlarged chamber above the expansion void when the core units are removed from between adjacent concrete slabs forming part of the road.

With the expansion void formed as described, the upper end of the void is closed or sealed by means of the preformed sealing cap or bar 21—22 which is constructed of rubber or other suitable material. The dovetailed sealing cap or bar is thus adapted to be compressed with the expansion of the concrete slabs 1, and furthermore will expand back into normal position with the contraction of the concrete slabs.

Attention is called to the improved method of providing an expansion joint in a concrete construction, said method including the positioning of a void closing base unit in place to support a removable and collapsible void forming core means shaped to leave an expansion void between concrete sections, said void having an enlarged upper chamber into which a pre-formed elastic sealing member is forced to close the upper end of the expansion void.

It will of course be understood that various details of construction may be varied through a wide range without departing from the principles of this invention, and it is, therefore, not the purpose to limit the patent granted hereon otherwise than necessitated by the scope of the appended claims.

I claim as my invention:

1. In road construction, a pair of spaced slabs of plastic material adapted to harden to provide a load carrying road, a pair of removable mold members entered between said pair of plastic slabs to shape opposing faces of said slabs for the defining of an expansion void between said plastic slabs, each of said mold members being provided with an enlarged and hemi-wedge-shaped portion to define a hemi-wedge-shaped recess in the opposing faces of the plastic slabs, and a strip of compressible and wedge-shaped material having its lower face supportedly seated on a formed face of each of said slabs and entered in the expansion void.

2. In road construction, a pair of spaced slabs of plastic material having opposed faces defining an expansion void therebetween, said slabs being adapted to harden to form a load carrying road, a wedge-shaped strip of compressible material entered in the expansion void and having its lower face supportedly seated on the opposing faces of said slabs, and means to mold the opposing faces of said slabs while they are still plastic to define recesses complemental to the shape of said strip, said means comprising a pair of spaced and removable mold members entered between said slabs and each having a portion of hemi-wedge-shape cross-section.

3. A concrete construction joint forming mechanism for disposition between opposed faces of a pair of slabs in a concrete roadway and to mold the opposing faces of plastic slabs to define a chamber or pocket to house seating means, said forming mechanism comprising a plurality of aligned load transmission base units, a plurality of aligned collapsible core units removably supported on said base units, splicing means overlapping the adjacent ends of said base units and said core units, said core units having extension members thereon and near the upper end thereof to mold opposed faces of the plastic slabs to define an expansion pocket having upwardly converging sides terminating at their lower end to define a ledge, means to fill the expansion pocket when the slabs have hardened and said core members have been removed, said means comprising a resilient rubber cap squeezed into said pocket and seated on said ledges.

4. In a road construction comprising a pair of concrete slabs having spaced opposed faces defining an expansion void and with the faces each shaped to define a recess and a ledge, a pre-cast bar of elastic material adapted to be squeezed into the void to fill the recesses and be supportedly seated on said ledges, said bar being provided with oppositely extending base flanges to seat on said ledges.

5. A road construction comprising a pair of spaced opposed slabs defining an expansion void, sealing means in said void, said sealing means comprising a pre-cast strip of resilient material having a superimposed body portion supported by integrally formed and oppositely extending base flanges seated at their lower face on opposing faces of said slabs.

6. A road construction comprising a pair of slabs arranged presenting opposed faces defining an expansion void therebetween, each of said opposing faces being recessed to define a pocket, resilient sealing means entered in said pockets, said sealing means being formed to define a body having a relatively narrow upper portion adjacent the wearing surface of the road and an enlarged portion remote from the wearing surface of the road and defining oppositely extending flanges entered in the pockets in the opposed faces of the slabs.

7. Sealing means for a road construction of the type in which a pair of slabs are arranged presenting opposed faces defining an expansion void and the faces are each recessed to define a pocket, said sealing means comprising a precast strip of rubber, or the like, formed to define an elongated body having an upper portion with longitudinally extending sides merging into downwardly and outwardly inclined sides at the base and presenting oppositely extending elongated base flanges.

ROBERT R. ROBERTSON.